United States Patent
Huang

(10) Patent No.: US 8,215,777 B2
(45) Date of Patent: Jul. 10, 2012

(54) LIGHT GUIDE MODULE AND PROJECTION APPARATUS HAVING THE SAME

(75) Inventor: June-Jei Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 332 days.

(21) Appl. No.: 12/551,669

(22) Filed: Sep. 1, 2009

(65) Prior Publication Data
US 2010/0060860 A1   Mar. 11, 2010

(30) Foreign Application Priority Data

Sep. 10, 2008 (TW) ................................ 97134678 A

(51) Int. Cl.
*G03B 21/28* (2006.01)
(52) U.S. Cl. ............. 353/33; 353/81; 348/743; 348/771
(58) Field of Classification Search ................. 353/33, 353/81; 348/742, 743, 771
See application file for complete search history.

(56) References Cited

U.S. PATENT DOCUMENTS

| | | | | |
|---|---|---|---|---|
| 3,479,108 A * | 11/1969 | Humphrey | .................... | 359/556 |
| 6,952,598 B2 * | 10/2005 | Kiyomatsu et al. | ........... | 455/566 |
| 7,222,975 B2 * | 5/2007 | Lin | .................................. | 353/94 |
| 7,396,132 B2 * | 7/2008 | Vandorpe et al. | ................ | 353/33 |
| 2004/0233393 A1 * | 11/2004 | Magarill et al. | ................. | 353/33 |

FOREIGN PATENT DOCUMENTS

CN   1790096   6/2006

OTHER PUBLICATIONS

Office Action from corresponding Chinese Application No. 200810213892.8 dated Jul. 9, 2010. English machine translation attached.

* cited by examiner

*Primary Examiner* — William C Dowling
(74) *Attorney, Agent, or Firm* — Grossman, Tucker, Perreault & Pfleger, PLLC

(57) ABSTRACT

A projection apparatus and a light guide module for use in the projection apparatus are provided. The projector apparatus comprises an illumination mechanism, at least one digital micromirror device (DMD), and a light guide module, wherein the light guide module includes a plurality of interfaces. The illumination mechanism provides a light beam which travels through the plurality of interfaces of the light guide module along a first axis without any rotation. The light beam orderly performs total internal reflections on each of the interfaces of the light guide module. Accordingly, the light beam travels to the at least one DMD, and then the light beam is reflected along a second axis.

18 Claims, 5 Drawing Sheets

LIGHT GUIDE MODULE AND PROJECTION APPARATUS HAVING THE SAME

This application claims priority to Taiwan Patent Application No. 097134678 filed on Sep. 10, 2008, the content of which is incorporated herein by reference in its entirety.

CROSS-REFERENCES TO RELATED APPLICATIONS

Not applicable.

BACKGROUND OF THE INVENTION

1. Field of the Invention

The present invention provides an optical structure, in particular, to a light guide module for use in a projection apparatus and the projection apparatus.

2. Descriptions of the Related Art

DLP (Digital Light Processing) projectors, which are developed by Texas Instruments, are projection displays that utilize a particular light source modulation scheme. The most prominent feature of DLP projectors is that, as a fully digitalized reflection projector, they can not only present finer projection images, but also allow for effective reduction in both volume and weight of the projectors, thereby making the projectors lighter, thinner, shorter and smaller. DLP projectors are classified into either single-chip or three-chip projectors, and are mainly used as super-lightweight portable and high-luminance projectors.

A DLP projector comprises a light source, a color wheel, a digital micromirror device (DMD) chip and a projection lens. Light from the light source is collected by a light collecting cover, focused via a lens and then sent through filters of three colors (i.e., red, green and blue) on a color wheel to the DMD chip. A memory associate with each pixel of the DMD records the value of a digital signal corresponding to the pixel, while the digital signal is transmitted to a drive electrode to induce positive or negative deflections of the micromirrors and control the deflection time. By controlling the rotational speed of the color wheel, alternation of the three primary colors (i.e., red, green and blue) can be accomplished to obtain a full color effect.

FIG. 1 is a schematic view of a projection apparatus 1 that adopts the conventional DLP technology. The projection apparatus 1 comprises a light source 101, a color wheel 103, a light integration rod 105, a relay mirror assembly 107, a TIR (Total Internal Reflection) prism 109 (including a first prism 109a and a second prism 109b), a DMD 111 and a projection lens 113. It should be noted that the color wheel 103 has three primary colors formed on individual portions adjacent to each other, with each color being formed on one portion respectively. Between a surface 1091 of the first prism 109a and a surface 1092 of the second prism 109b, there is an air gap 110. The two surfaces 1091, 1092 are substantially parallel to each other.

The light source 101 emits a white light beam (as indicated by the arrow), which is adapted to pass through the rotatable color wheel 103 to be split into different color lights. Then, the color lights travel through the light integration rod 105 to the relay mirror assembly 107. It should be particularly noted that the relay mirror assembly 107 comprises a first reflecting mirror 107a and a second reflecting mirror 107b, while the color lights exiting from the light integration rod 105 are reflected sequentially by the first reflecting mirror 107a and the second reflecting mirror 107b to the first prism 109a. The first reflecting mirror 107a and the second reflecting mirror 107b are not in the same plane, so there is a three-dimensional rotation of the light beam reflected by these surfaces.

Upon entering the first prism 109a, the color lights undergo a total internal reflection and then travel to the DMD 111. Then, the color lights are selectively reflected by the DMD 111 back to the first prism 109a, passes through the first prism 109a, the air gap 110 and the second prism 109b in turn, and finally enters the projection lens 113 to form an image to be projected.

However, the design of the projection apparatus 1 has the following disadvantages:

Firstly, in the conventional projection apparatus, the light integration rod 105 has a profile (e.g., a rectangle with an aspect ratio of 16:9, with a long direction thereof lying in the vertical direction) that is rotated by 90° relative to that of the DMD 111 (e.g., a rectangle with an aspect ratio of 9:16, with a long direction thereof lying in the horizontal direction). In more detail, after passing through the light integration rod 105, the light beam will also present a rectangular profile whose long direction lies in the vertical direction and whose aspect ratio is 16:9. When this incident light beam is guided by the rotation of the first reflecting mirror 107a, the reflected light beam thereof will exhibit a profile whose normal direction is rotated by a certain angle relative to the incident direction and then enters the second reflecting mirror 107b. Afterwards, the light beam is guided by the rotation of the second reflecting mirror 107b again, causing the normal direction of the reflected light beam's profile to be rotated by a further angle before the light beam enters the TIR prism 109. As a result, the light beam entering the TIR prism 109 has a rectangular profile whose long direction lies in the horizontal direction with an aspect ratio of 9:16. Then, through a TIR in the TIR prism 109, the light beam is reflected to the DMD 111 to be imaged and then is projected the projection lens 113. As the reflected light beam presents attenuated luminance, this may degrade the utilization efficiency of the light source within the projection apparatus to an extent that the image finally obtained has inadequate luminance.

Secondly, to collect light effectively in the aforesaid projection apparatus between the light integration rod and multiple light sources, the optical structure is designed in such a way that two light sources, namely a left and a right light sources, are arranged at an upper and a lower position respectively (i.e., arranged asymmetrically with one at an upper left position and the other at a lower right position; or alternatively, with one at a lower left position and the other at an upper right position). Three light integration rods are used (i.e., two of them are arranged at an upper and a lower position respectively near the light sources, and the third one is arranged far away from the light sources to integrate light beams from the aforesaid two light integration rods). Consequently, the conventional projection apparatus with multiple light sources is difficult to design and exhibits a poor space utilization.

Thirdly, in the projection apparatus 1, a fixing structure (not shown) is needed to position the reflecting mirrors 107a, 107b. However, because orientations of the mirrors have a direct influence on the light path, they must be positioned accurately in order to ensure a correct light path. Consequently, the procedure of positioning the mirror assembly is very complex and tedious, which is unfavorable for mass production of projection apparatuses.

In view of this, it is important to provide a projection apparatus with improved imaging quality, miniaturized profile and light weight by improving the complex light path design of the conventional projection apparatus and reducing loss of luminance of the light source.

SUMMARY OF THE INVENTION

One objective of the present invention is to provide a light guide module for use in a projection apparatus. By using an improved TIR prism design instead of the reflecting mirrors as used in conventional projection apparatuses, this light guide module overcomes the problem of luminance loss in the conventional light path and simplifies the layout of components in the projection apparatus.

The present invention provides a light guide module for use in a projection apparatus. The projection apparatus comprises an illumination mechanism and a DMD (Digital Micromirror Device). The illumination mechanism is adapted to provide a light beam, which travels along a first axis to the DMD via the light guide module and is then reflected along a second axis. The light guide module comprises a plurality of interfaces adapted to enable the light beam to undergo a plurality of total internal reflections on each of the interfaces in turn. The total internal reflections have a traveling direction parallel to a reference plane, while the first and second axes are parallel to each other.

Another objective of the present invention is to provide a projection apparatus that utilizes an improved TIR prism design. This, on one hand, reduces the back focal length of the projection lens in the projection apparatus to allow for reduction in the volume of the projection apparatus and facilitate the development towards miniaturized and lightweight projection apparatuses. On the other hand, the design makes it easy to integrate multiple light sources into the projection apparatus and enhance the ability of the projection lens to collect light beams, thereby improving the quality of images projected.

To this end, the present invention provides a projection apparatus, which comprises an illumination mechanism, at least one DMD (Digital Micromirror Device) and a light guide module. The illumination mechanism is adapted to provide a light beam, and the light guide module is adapted to guide a traveling direction of the light beam. The light beam travels along a first axis to the DMD via the light guide module, and is then reflected along a second axis. The light guide module comprises a plurality of interfaces adapted to enable the light beam to undergo a plurality of total internal reflections on each of the interfaces in turn. The total internal reflections have a traveling direction parallel to a reference plane, and the first axis and the second axis are parallel to each other.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, the present invention will be explained with reference to embodiments thereof. However, these embodiments are only for purposes of illustration, but not to limit the present invention to any specific environment, applications or particular implementations described in these embodiments. It should be appreciated that in the following embodiments and the attached drawings, elements not directly related to this invention are omitted from depiction.

Figure 2:
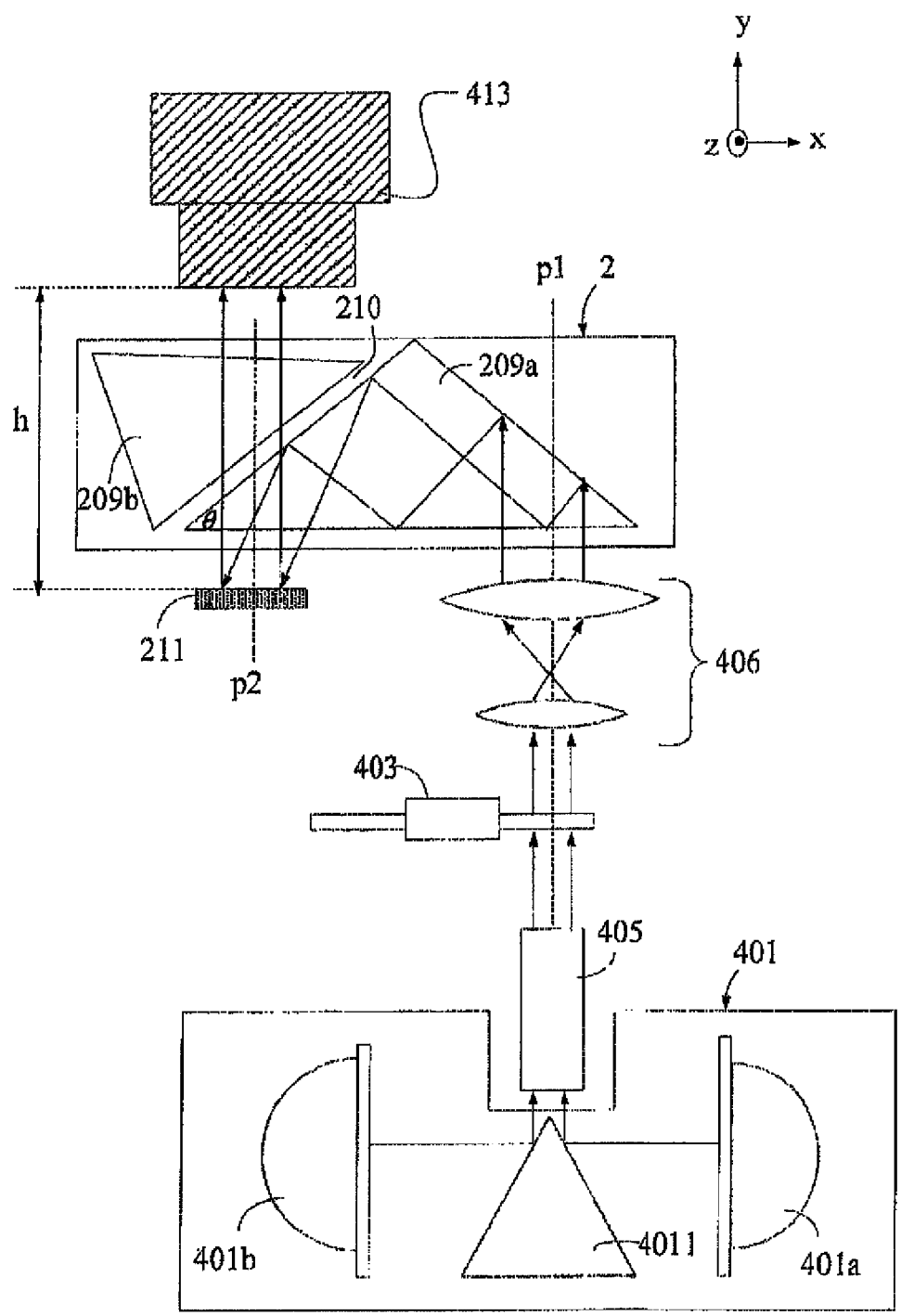
FIG. 2 is a schematic view of a projection apparatus according to an embodiment of the present invention.

FIG. 2 illustrates a schematic view of an embodiment of a projection apparatus 4 according to the present invention. The projection apparatus 4 comprises an illumination mechanism 401, a color wheel 403, a light integration rod 405, a relay mirror assembly 406, a DMD 211, a light guide module 2 and a projection lens 413. It should be appreciated that although this embodiment shown in FIG. 2 is described with reference to a single DMD chip, the present invention is not limited thereto, and those of ordinary skill in the art may use a Philips prism (not shown) with a projection apparatus that has three DMD chips upon reviewing the present disclosure. Therefore, applications where the projection apparatus has three DMD chips are omitted from description herein. Furthermore, the projection apparatus of the present invention is particularly suited to an illumination mechanism with multiple light sources integrated therein, although the present invention is not limited thereto. Hereinafter, an example in which the illumination mechanism 401 comprises two light emitting devices 401a, 401b will be described to explain features of the present invention.

Figure 3:
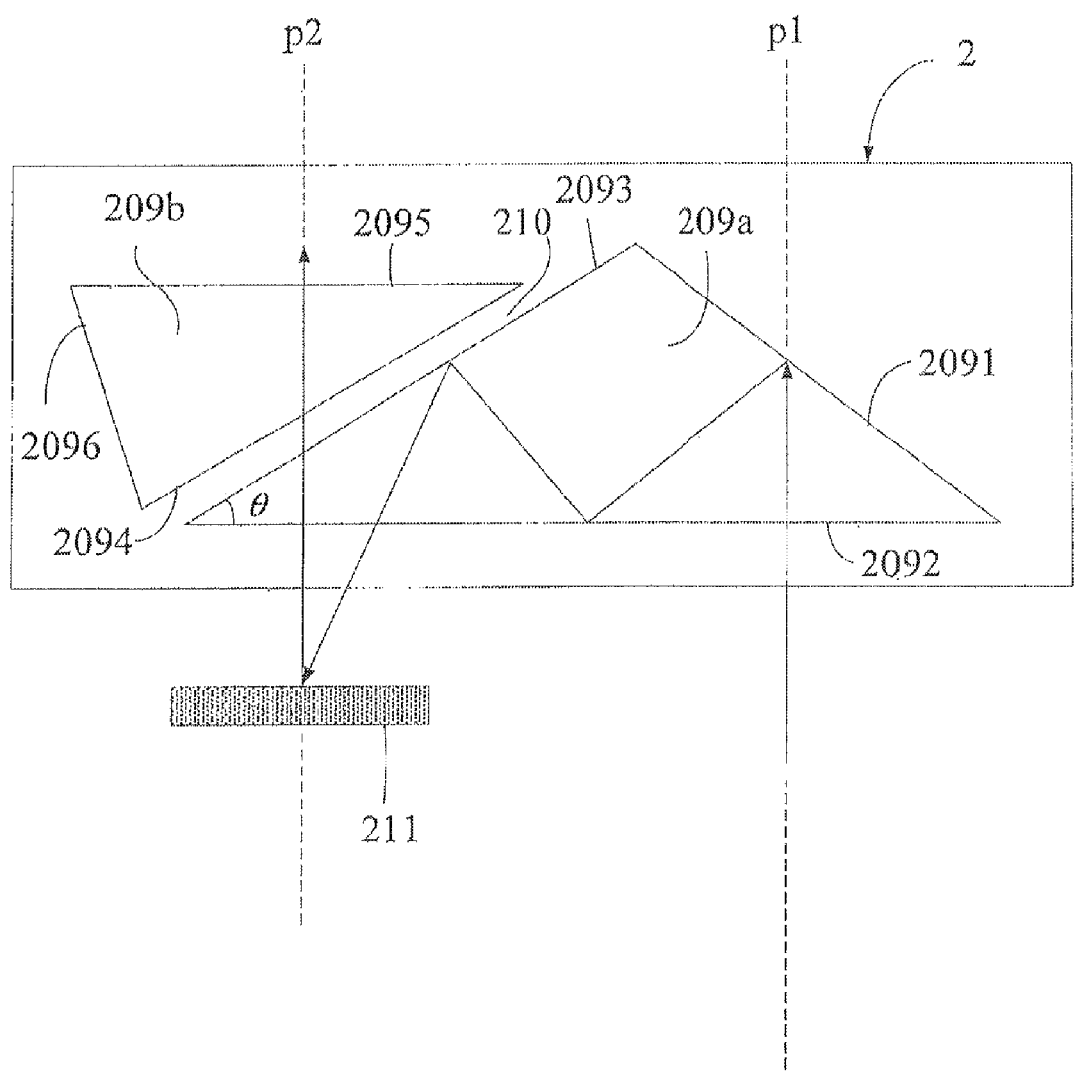
FIG. 3 is a schematic view of a light guide module according to an embodiment of the present invention.

FIG. 3 illustrates a schematic view of a light guide module 2 in the projection apparatus 4. The light guide module 2 of the present invention comprises at least one prism, each of which has a plurality of surfaces adapted to define a plurality of interfaces. In this embodiment, the light guide module 2 comprises a first prism 209a and a second prism 209b, both of which are triangular prisms. Specifically, the first prism 209a is approximately an isosceles triangular prism with a first surface 2091, a second surface 2092 and a third surface 2093. The second prism 209b is approximately a right-angle triangular prism with a first surface 2094, a second surface 2095 and a third surface 2096. The third surface 2093 of the first prism 209a is substantially parallel to the first surface 2094 of the second prism 209b.

Furthermore, the first prism 209a and the second prism 209b have a high refractive index. For example, the first prism 209a and the second prism 209b are made of a glass material with a refractive index of 1.6 to 2.0. For example, an SF57 glass material with a refractive index of 1.8, although the present invention is not limited thereto. A medium 210 is interposed between the adjacent surfaces of the first prism 209a and the second prism 209b. In particular, the medium 210 is interposed between the third surface 2093 of the first prism 209a and the first surface 2094 of the second prism 209b, and has a refractive index smaller than those of the first prism 209a and the second prism 209b to reduce the divergence angle of the light beam and consequently facilitate the occurrence of total internal reflections when the light beam propagates from the first prism 209a (a dense medium) to the interface with the medium 210 (a spare medium). In this embodiment, the medium 210 is air with a refractive index of substantially 1.0.

Figure 1:
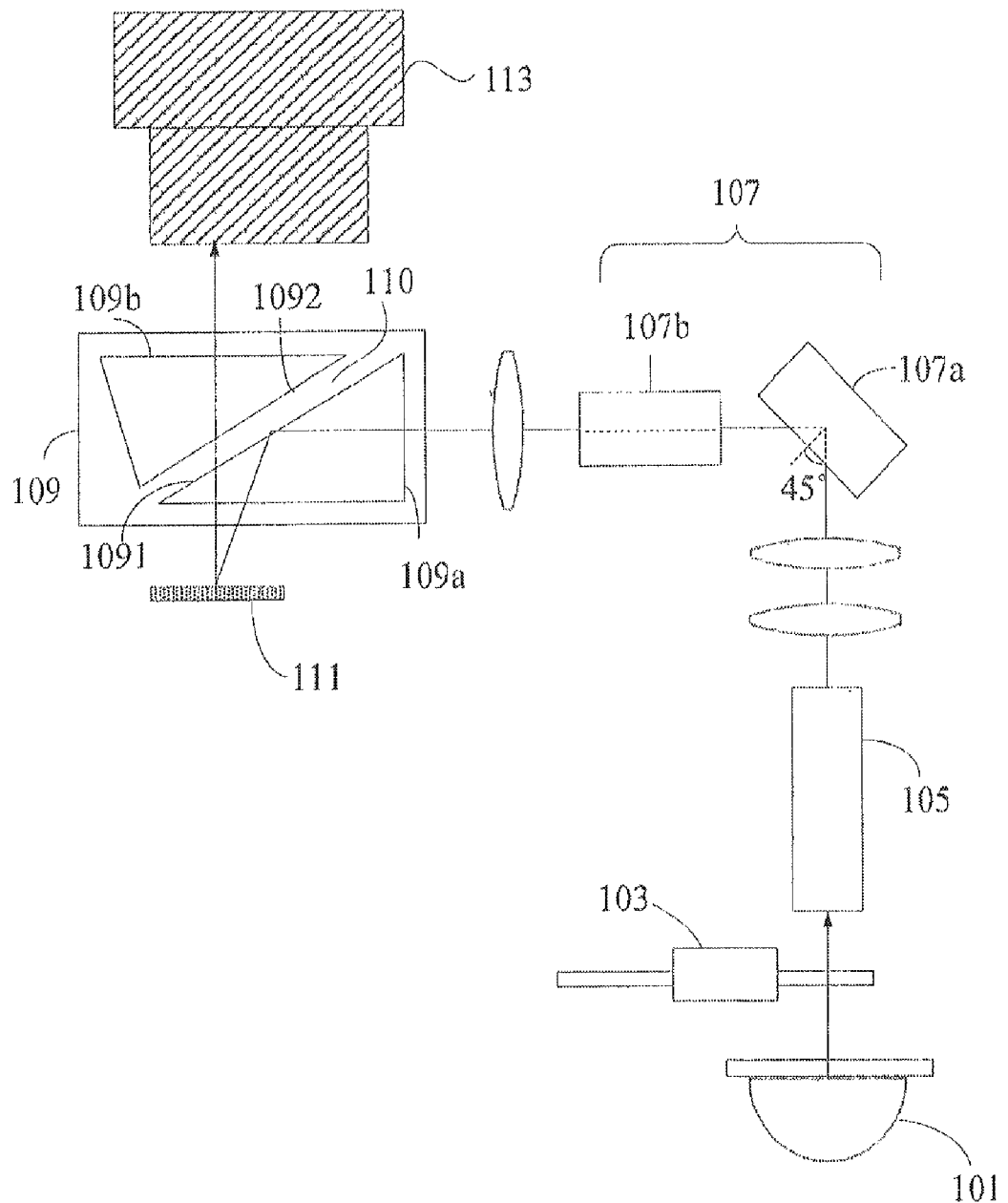
FIG. 1 is a schematic view of a conventional projection apparatus utilizing DLP technology.

The projection apparatus 4 of the present invention is characterized in that the light beam from the illumination mechanism 401 undergoes a plurality of total internal reflections within the light guide module 2, so the reflecting mirrors (e.g., the reflecting mirrors 107a, 107b in FIG. 1) of the relay mirror assembly in the conventional optical mechanism can be simplified. In particular, the light beam supplied by the illumination mechanism 401 of this embodiment passes through the light integration rod 405 and the color wheel 403 in turn, and then enters the first prism 209a of the light guide module 2 along a first axis p1. Because the refractive index of the first prism 209a is much higher than that of the medium 210, a total internal reflection is more likely to take place each time when a light beam travels to the interface between the first prism 209a and the medium 210. Moreover, the larger the difference in refractive indexes, the smaller the critical angle at which total internal reflection takes place and therefore, the more likely total internal reflection will take place.

In particular, in this embodiment, the light beam undergoes three total internal reflections within the first prism 209a and then enters the DMD 211 via the first prism 209a, where it is imaged and reflected by micromirrors (not shown) distributed on the DMD 211 along a second axis p2 and is projected through the projection lens 413. Here, the first axis p1 and the second axis p2 are parallel to each other, and the three total internal reflections take place on the first surface 2091, the second surface 2092 and the third surface 2093 of the first prism 209a respectively.

Figure 4:
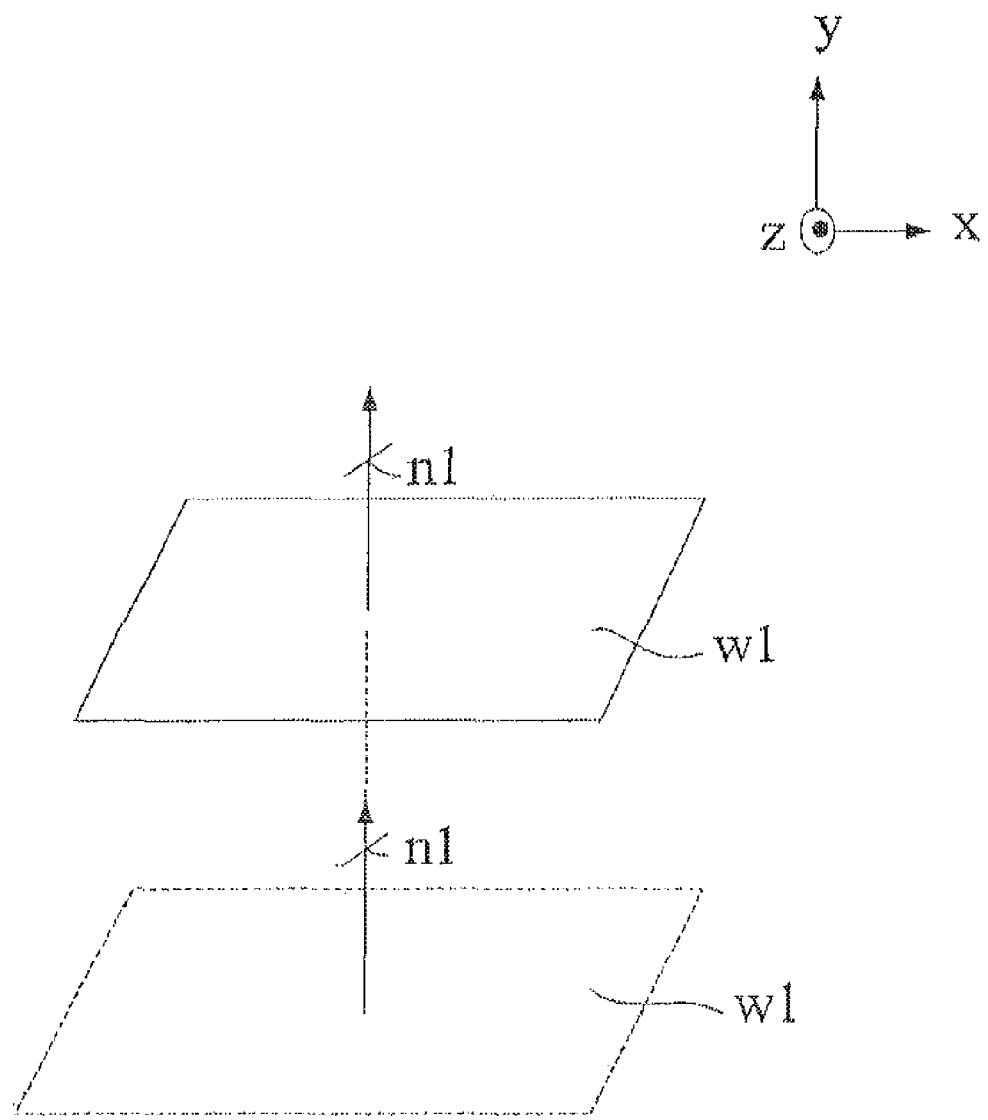
FIG. 4 is a schematic view illustrating propagation of a light beam within the light guide module according to an embodiment of the present invention.

It should be noted that the aforesaid total internal reflections have a traveling direction parallel to a reference plane. In more detail, when traveling along the first axis p1, the light beam propagates in form of a plane wave w1 as shown in FIG. 4. The plane wave w1 of the light beam is distributed in the xz plane of the three-dimensional space (taking the coordinate system (x, y, z) as an example), and the direction in which the light beam travels (i.e., a normal direction n1 of the plane wave w1) is parallel to the y axis of the three-dimensional coordinate system (x, y, z). When the light beam undergoes a total internal reflection within the first prism 209a, all variations of the normal direction n1 of the plane wave w1 are parallel to the xy plane; i.e., the light beam entering the light guide module 2 of the present invention travels along a direction parallel to the xy plane at all times, so no three-dimensional rotation of the light beam occur with.

Figure 5:
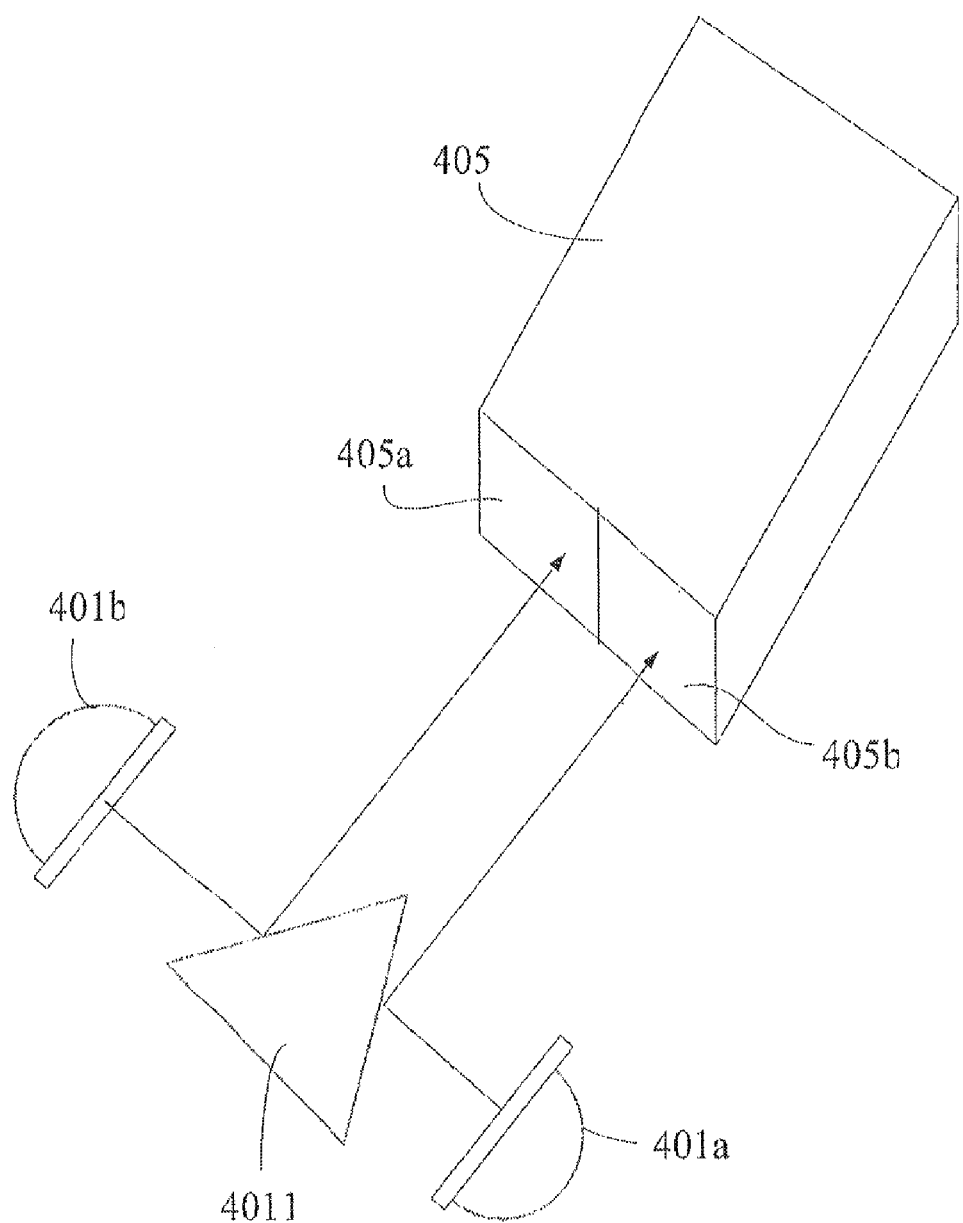
FIG. 5 is a schematic view illustrating a beam light incident on a light integration rod according to an embodiment of the present invention.

As described above, the light guide module 2 of the present invention is adapted to have the light beam undergo a plurality of total internal reflections parallel to a reference plane without incurring three-dimensional rotations, so the optical mechanism disclosed in the projection apparatus of the present invention is particularly applicable to the integration of multiple light sources. In particular, because the light beam only undergoes total internal reflections without incurring three-dimensional rotations when traveling in the light guide module 2, the aspect ratio of the profile of the light integration rod 405 may be identical to that of the profile of the DMD 211 in the present invention (e.g., the two profiles are both rectangles with an aspect ratio of 9:16 and the long direction of each rectangle lying in the horizontal direction). On the other hand, because the profile of the light integration rod 405 is a rectangle whose long direction lies in the horizontal direction, the cross section of the light integration rod 405 may be divided, in terms of the light path arrangement, into a left and a right regions 405a, 405b adapted to receive light beams from the left and the right light source of the illumination structure 401 respectively, as shown in FIG. 5. In other words, in the illumination structure 401 of the projection apparatus 4 of the present invention, two light emitting devices 401a, 401b may be easily disposed horizontally and symmetrically so that light beams from the light emitting devices 401a, 401b are reflected by two side edges of the prism 4011 respectively and then collected by the regions 405a, 405b of the light integration rod 405 along the first axis p1. This facilitates effective utilization and arrangement of the internal space of the projection apparatus 4, and as compared to prior art solutions where the left and the right light source must be arranged asymmetrically at an upper and a lower position respectively, to coordinate with the light integration rod, (i.e., arranged asymmetrically with one at an upper left position and the other at a lower right position; or alternatively, with one at a lower left position and the other at an upper right position), the projection apparatus 4 of the present invention allows for effective utilization of the limited space within the projection apparatus, thereby resulting in a smaller volume.

It should be noted that the light guide module 2 of the present invention guides the light beams to undergo total internal reflections therein parallel to a reference plane, so the relay mirror assembly 406 of the projection apparatus 4 of the present invention can eliminate use of two reflecting mirrors (e.g., the reflecting mirrors 107a, 107b in FIG. 1) that would otherwise be needed in the prior art optical mechanism, thereby making the projection apparatus lightweight and eliminating the complex procedure of positioning the reflecting mirrors and difficulty in controlling the positioning accuracy. Moreover, the problem that the multiple reflections of conventional light paths may result in luminance loss of light beams can also be solved.

Furthermore, the projection apparatus 4 of the present invention is characterized in that a substantial decrease in the thickness of the first prism 209a of the light guide module 2 is made possible. As shown in FIG. 3, when the micromirrors on the DMD 211 are tilted by 12° relative to the second axis p2, a negative correlation relationship will be obtained between the angle θ of the first prism 209a and the refractive index N of the first prism 209a, i.e., $\theta=\sin^{-1}(1/N)-\sin^{-1}(0.21/N)$. For example, when the refractive index N is 1.8, the angle θ of the first prism 209a is 27.11°; and when the refractive index N is 2.0, the angle θ of the first prism 209a is 24°. Therefore, the larger the refractive index of the prism 209a is, the smaller the angle θ of the first prism 209a and, accordingly, the thinner the prism. It is particularly important that as the prism decreases in thickness, a back focal length h between the inner end of the projection lens 413 and the DMD 211 decreases correspondingly, which helps to further shrink the volume of the projection apparatus 4 and remarkably enhance the projection lens's ability to collect light beams, thereby improving the quality of the output images.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A light guide module for use in a projection apparatus, the projection apparatus comprising an illumination mechanism and a DMD (Digital Micromirror Device), the illumination mechanism being adapted to provide a light beam, the light beam traveling along a first axis to the DMD via the light guide module, and then the light beam being reflected along a second axis, the light guide module comprising:
 a plurality of interfaces, being adapted to enable the light beam to undergo a plurality of total internal reflections on each of the interfaces in turn, wherein the total internal reflections have a traveling direction parallel to a reference plane, and the first axis and the second axis are parallel to each other; and a first prism, having a first surface, a second surface and a third surface for defining the interfaces, and the first prism having a refractive index substantially between 1.6 to 2.0, wherein the light beam travels to the first prism along the first axis, and then the light beam undergoes the total internal reflections on the first surface, the second surface and the third surface of the first prism in turn.

2. The light guide module as claimed in claim 1, further comprising:

a second prism having a first surface and a second surface, wherein the third surface of the first prism is at least partially adjacent to the first surface of the second prism, and the light beam travels to the DMD and is reflected to pass through the second prism thereby.

3. The light guide module as claimed in claim 2, further comprising a medium, disposed between the third surface of the first prism and the first surface of the second prism, and the medium having a refractive index smaller than those of the first prism and the second prism.

4. The light guide module as claimed in claim 2, wherein the refractive index of the second prism is substantially between 1.6 and 2.0.

5. The light guide module as claimed in claim 3, wherein the medium is air.

6. The light guide module as claimed in claim 5, wherein the light beam travels to the DMD and is reflected and passes through the second prism along the second axis, wherein the first axis and the second axis are parallel to each other.

7. The light guide module as claimed in claim 6, wherein the third surface of the first prism is substantially parallel to the first surface of the second prism.

8. A projection apparatus, comprising:

an illumination mechanism, being adapted to provide a light beam;

at least one DMD (Digital Micromirror Device); and a light guide module, the light beam traveling along a first axis to the DMD via the light guide module, and then the light beam being reflected along a second axis, the light guide module comprising:

a plurality of interfaces, being adapted to enable the light beam to undergo a plurality of total internal reflections on each of the interfaces in turn, wherein the total internal reflections having a traveling direction parallel to a reference plane, and the first axis and the second axis are parallel to each other; and a first prism, having a first surface, a second surface and a third surface for defining the interfaces, and the first prism having a refractive index substantially between 1.6 to 2.0, wherein the light beam travels to the first prism along the first axis, and then the light beam undergoes the total internal reflections on the first surface, the second surface and the third surface of the first prism in turn.

9. The projection apparatus as claimed in claim 8, further comprising a projection lens, wherein the light beam is reflected to the projection lens from the DMD.

10. The projection apparatus as claimed in claim 9, further comprising an integrated rod, being configured to uniform the light beam emitted from the illumination mechanism, wherein a long direction of a profile of the integrated rod is a horizontal direction and is parallel to a long direction of a profile of the DMD.

11. The projection apparatus as claimed in claim 10, wherein the illumination mechanism has two emitting devices, which are disposed in opposition to each other, the light beam emitted from each of the emitting devices travels to a left-side portion and a right-side portion of the profile of the integrated rod after one reflection respectively.

12. The projection apparatus as claimed in claim 8, further comprising three DMDs and a Philips prism, the Philips prism being disposed between the DMDs and the light guide module, the light beam is split into three color beams via the Philips prism, each of the color beams traveling to each DMD respectively, after the color beams being reflected from the DMDs, the three color beams being combined via the Philips prism, and then traveling to the light guide module.

13. The projection apparatus as claimed in claim 8, further comprising:

a second prism having a first surface and a second surface, wherein the third surface of the first prism is at least partially adjacent to the first surface of the second prism, and the light beam travels to the DMD and is reflected to pass through the second prism thereby.

14. The projection apparatus as claimed in claim 13, further comprising a medium, being disposed between the third surface of the first prism and the first surface of the second prism, and the medium having a refractive index smaller than those of the first prism and the second prism.

15. The projection apparatus as claimed in claim 14, wherein the refractive index of the second prism is substantially between 1.6 to 2.0.

16. The projection apparatus as claimed in claim 14, wherein the medium is air.

17. The projection apparatus as claimed in claim 16, wherein the light beam travels to the DMD and is reflected and passes through the second prism along the second axis, wherein the first axis and the second axis are parallel to each other.

18. The projection apparatus as claimed in claim 17, wherein the third surface of the first prism is substantially parallel to the first surface of the second prism.

* * * * *